United States Patent
Wang

(10) Patent No.: US 10,841,021 B2
(45) Date of Patent: Nov. 17, 2020

(54) CIRCUIT FOR CALIBRATING BAUD RATE AND SERIAL PORT CHIP

(71) Applicant: SHENZHEN GOODIX TECHNOLOGY CO., LTD., Guangdong (CN)

(72) Inventor: Huizhao Wang, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/657,261

(22) Filed: Oct. 18, 2019

(65) Prior Publication Data
US 2020/0052801 A1 Feb. 13, 2020

Related U.S. Application Data

(63) Continuation of application No. PCT/CN2018/099008, filed on Aug. 6, 2018.

(51) Int. Cl.
*H04B 17/21* (2015.01)
*H04L 7/00* (2006.01)
(Continued)

(52) U.S. Cl.
CPC .......... *H04B 17/21* (2015.01); *H04L 7/0087* (2013.01); *H04L 7/048* (2013.01); *H04L 7/06* (2013.01)

(58) Field of Classification Search
CPC ..... H04B 17/21; H04L 25/062; H04L 7/0087; H04L 7/0331; H04L 7/044; H04L 7/048; H04L 7/06; H04L 17/21
See application file for complete search history.

(56) References Cited

U.S. PATENT DOCUMENTS 6,970,525 B1 * 11/2005 Kljajic ............... G06F 7/68
327/291
7,342,984 B1 3/2008 Yearsley et al.
(Continued)

FOREIGN PATENT DOCUMENTS

CN 101431389 A 5/2009
CN 109075742 A 12/2018

OTHER PUBLICATIONS

Extended European Search Report for European Application No. 18914926.3 dated Feb. 21, 2020.
(Continued)

*Primary Examiner* — David B Lugo
(74) *Attorney, Agent, or Firm* — Heslin Rothenberg Farley & Mesiti P.C.

(57) ABSTRACT

The present disclosure relates to a circuit for calibrating a baud rate. The circuit includes: a first counter connected to a receiving module of a serial port chip and configured to record a first low level duration of a data frame received by the receiving module; a second counter configured to: receive a bit sampling pulse generated from sampling the data frame according to a current baud rate of the receiving module, and record a quantity of the bit sampling pulse in the first low level duration; a divider, connected to the first counter and the second counter and calculate a calibration baud rate according to the first low level duration and the quantity of the bit sampling pulse in the first low level duration; and a selector, connected to the receiving module and the divider and configured to output the calibration baud rate to the receiving module.

16 Claims, 4 Drawing Sheets

(51) Int. Cl.
*H04L 7/04* (2006.01)
*H04L 7/06* (2006.01)

(56) References Cited

U.S. PATENT DOCUMENTS

| | | |
|---|---|---|
| 8,953,662 B1 | 2/2015 | Zhu et al. |
| 2013/0259095 A1* | 10/2013 | Chen .................... G06F 13/385 |
| | | 375/211 |
| 2016/0127109 A1 | 5/2016 | Shimosakoda |
| 2019/0081828 A1* | 3/2019 | Ye .......................... H04L 7/044 |

OTHER PUBLICATIONS

International Search Report for International Application No. PCT/CN2018/099008 dated May 10, 2019.

* cited by examiner ial port chip
CIRCUIT FOR CALIBRATING BAUD RATE AND SERIAL PORT CHIP

CROSS REFERENCE TO RELATED APPLICATIONS

The present application is a continuation of international application No. PCT/CN2018/099008, filed on Aug. 6, 2018, which is hereby incorporated by reference in its entirety.

TECHNICAL FIELD

The present disclosure relates to communication technologies, and in particular, to a circuit for calibrating a baud rate and a serial port chip.

BACKGROUND

A baud rate is a measure of a rate at which symbols are transmitted, and one baud means that one symbol is transmitted per second. In a common serial port communication system, one symbol corresponds to one bit, so that one baud can also be understood as that one bit is transmitted per second. In addition, in the common serial port communication system, a sending end and a receiving end are required to agree on the same baud rate in advance to implement normal communication, thereby ensuring that data sent by the sending end is the same with data received by the receiving end.

However, the inventor of the present disclosure found that at least the following problems exist in existing technologies: an internal clock offset between two ends of communication leads to a mismatch between a baud rate at which the receiving end receives data and a baud rate at which the sending end sends data (as shown in FIG. 1 and FIG. 2). As a result, the receiving end fails to receive data normally, which means less reliable data transmission or even abnormal data communication. However, most existing methods for calibrating a baud rate are based on a data frame with a default byte. To be specific, the sending end and the receiving end need to agree on a data frame with a default byte in advance. During data transmission between the sending end and the receiving end, the sending end needs to first send the data frame with a default byte, so that the receiving end calibrates a baud rate according to information used when the receiving end receives the data frame with the default byte. This method cannot calibrate a baud rate in real time, and is therefore not suitable for a communication system in an extremely fast-changing communication environment and is subject to severe limitations.

SUMMARY

One technical problem to be resolved by some embodiments of the present disclosure is to provide a circuit for calibrating a baud rate and a serial port chip, to calibrate a baud rate dynamically and in real time and receive data more reliably.

An embodiment of the present disclosure provides a circuit for calibrating a baud rate. The circuit includes:

a first counter, which is connected to a receiving module of a serial port chip and configured to record a first low level duration of a data frame received by the receiving module;

a second counter, which is connected to the receiving module and configured to: receive a bit sampling pulse, and record a quantity of the bit sampling pulse in the first low level duration, where the receiving module samples the data frame according to a current baud rate of the receiving module to generate the bit sampling pulse;

a divider, which is connected to the first counter and the second counter and configured to calculate a calibration baud rate according to the first low level duration and the quantity of the bit sampling pulse in the first low level duration; and a selector, which is connected to the receiving module and the divider and configured to output the calibration baud rate to the receiving module.

An embodiment of the present disclosure further provides a serial port chip. The serial port chip includes: a receiving module and the circuit for calibrating a baud rate as described above, where the receiving module is configured to: receive a data frame sent by an opposite end, send a start instruction and a stop instruction according to the data frame, and sample the data frame according to a current baud rate of the receiving module to generate a bit sampling pulse; and the circuit for calibrating a baud rate is connected to the receiving module and configured to: calculate a calibration baud rate according to the start instruction, the stop instruction and the bit sampling pulse, and output the calibration baud rate to the receiving module.

Compared with existing technologies, when the receiving module of the serial port chip in the embodiment of the present disclosure receives the data frame, the first counter is used to record the first low level duration of the data frame, and the second counter is used to record the quantity of the bit sampling pulse in the first low level duration generated from sampling by the receiving module, to estimate a quantity of bits in the first low level duration actually received by the receiving module, so that the calibration baud rate is calculated and output to the receiving module to update and replace the baud rate of the receiving module. In this way, an actual baud rate in a current process of data transmission can be obtained without relying on a data frame with a default byte, so that a baud rate is recognized automatically and calibrated dynamically and in real time, a baud rate with high precision can be obtained, and reliability of subsequent data reception of the receiving module is effectively improved.

In addition, the selector is further connected to the first counter, and is configured to output the calibration baud rate to the receiving module when the first low level duration is less than a preset duration. In this embodiment, the selector determines, according to a comparison result between the first low level duration and the preset duration, whether an error occurs in data reception of the receiving module. The selector outputs the calibration baud rate to the receiving module only when the first low level duration is less than the preset duration, to update and replace the baud rate of the receiving module, so that the baud rate can be ensured to be calibrated and updated effectively and in time, and the reliability of subsequent data reception of the receiving module is improved.

In addition, the preset duration is set by the selector according to the current baud rate of the receiving module. In this embodiment, the selector can set an appropriate preset duration, thereby effectively reducing possibility of incorrect determination.

In addition, the selector is further connected to the second counter, and is configured to output the calibration baud rate to the receiving module when the quantity of the bit sampling pulse in the first low level duration is less than a preset quantity. In this embodiment, the selector determines, according to a comparison result between the quantity of the bit sampling pulse in the first low level duration and the preset quantity, whether an error occurs in data reception of the receiving module or an internal clock offset between two ends of communication is excessively large. The selector outputs the calibration baud rate to the receiving module only when the quantity of the bit sampling pulse in the first low level duration is less than the preset quantity, to update and replace the baud rate of the receiving module, so that the baud rate can be ensured to be calibrated and updated effectively and in time, and the reliability of subsequent data reception of the receiving module is improved.

In addition, the preset quantity is 7. In this embodiment, a specific implementation of the preset quantity is provided.

In addition, the selector is further connected to a sending module of the serial port chip, and the selector is further configured to output the calibration baud rate to the sending module. In this embodiment, the circuit for calibrating a baud rate also updates a baud rate of a sending module, and can make a baud rate of the sending module of the serial port chip at a local end match a baud rate of a receiving module of a serial port chip at an opposite end in a case of duplex communication between the serial port chip at the local end and the serial port chip at the opposite end, thereby ensuring reliable data transmission.

In addition, the calibration circuit further includes: a calibration output register, which is connected to the selector and configured to output a preset signal after the selector outputs the calibration baud rate to the receiving module, where the preset signal is used to represent whether a baud rate is successfully calibrated. This embodiment provides an implementation of outputting a calibration result, so that with content shown on an host computer, a technician can know whether a baud rate of the serial port chip is successfully calibrated.

BRIEF DESCRIPTION OF THE DRAWINGS

One or more embodiments are exemplarily described with reference to figures in accompanying drawings corresponding to one or more embodiments. These exemplary descriptions do not constitute any limitation to the embodiments. Elements having the same reference numerals in the accompanying drawings are similar elements. Unless otherwise stated, proportions are not limited in the accompanying drawings.

DETAILED DESCRIPTION

To make objectives, technical solutions, and advantages of the present disclosure clearer, some embodiments of the present disclosure are described in detail below with reference to accompanying drawings and embodiments. It should be understood that the specific embodiments described herein are merely used to describe the present disclosure and are not intended to limit the present disclosure.

Figure 1:
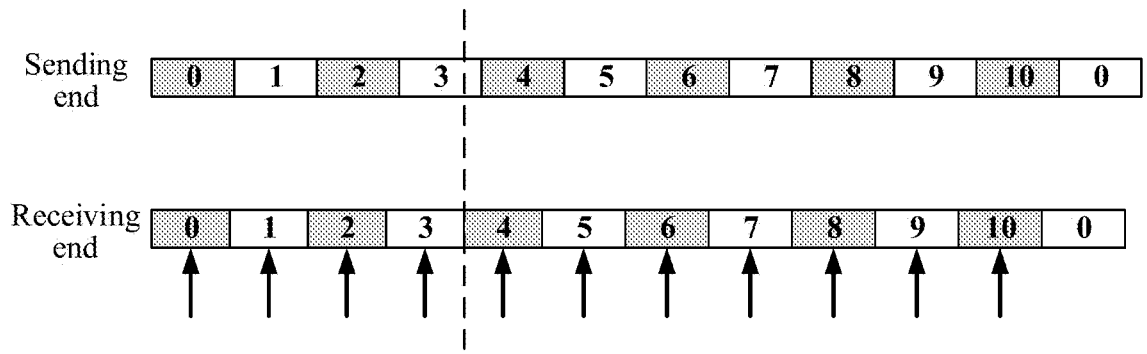
FIG. 1 is a sequence diagram of data reception in which a baud rate of a sending end is greater than a baud rate of a receiving end.
Figure 2:
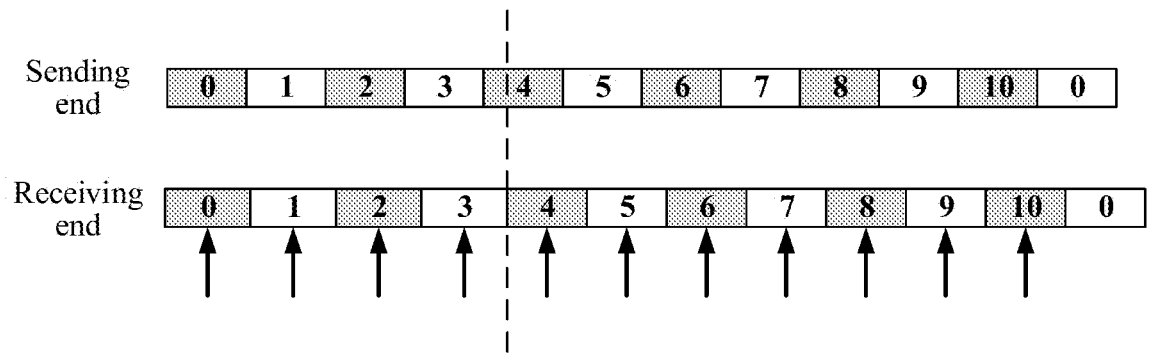
FIG. 2 is a sequence diagram of data reception in which a baud rate of a sending end is less than a baud rate of a receiving end.
Figure 3:
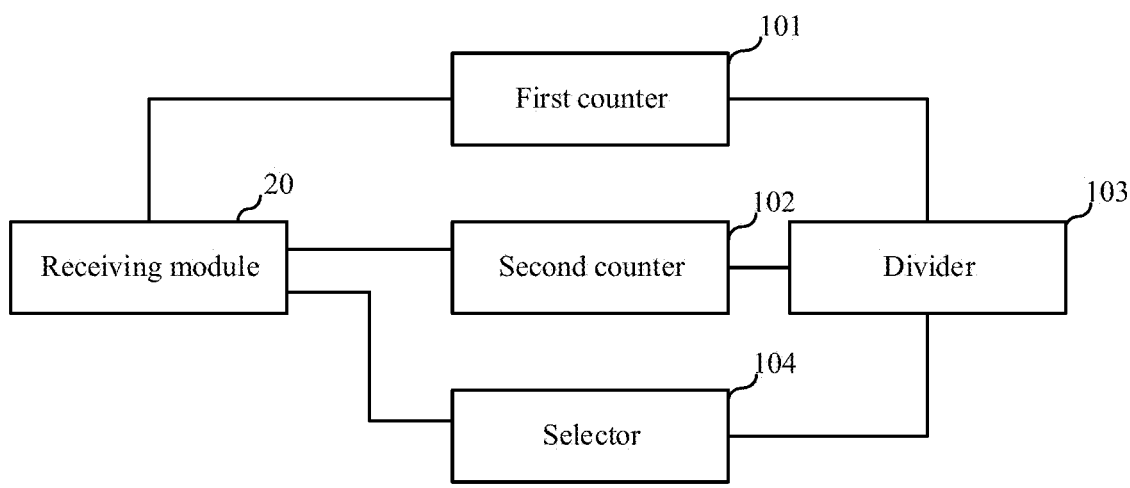
FIG. 3 is a structural schematic diagram of a circuit for calibrating a baud rate according to a first embodiment of the present disclosure.

A first embodiment of the present disclosure relates to a circuit for calibrating a baud rate, as shown in FIG. 3. The circuit for calibrating a baud rate in this embodiment is located in a serial port chip at a local end, and can dynamically calibrate a baud rate of a receiving module 20 of the serial port chip in real time, thereby improving reliability of data reception of the receiving module 20. A working principle of the circuit for calibrating a baud rate in this embodiment is described in detail below.

In this embodiment, the circuit for calibrating a baud rate includes a first counter 101, a second counter 102, a divider 103, and a selector 104. The first counter 101, the second counter 102, and the selector 104 are respectively connected to the divider 103. When the circuit for calibrating a baud rate is applied to the serial port chip, the first counter 101, the second counter 102, and the selector 104 are further connected to the receiving module 20 of the serial port chip.

Specifically, when the receiving module 20 receives a data frame sent by an opposite end, the receiving module 20 sends a start instruction to the first counter 101 and the second counter 102, to instruct the first counter 101 and the second counter 102 to start counting, and in addition, the receiving module 20 further performs bit sampling according to a current baud rate, and returns a bit sampling pulse generated from the sampling to the second counter 102, so that the second counter 102 counts a quantity of the bit sampling pulse.

More specifically, when detecting a first high level of the data frame, the receiving module 20 sends a stop instruction to the first counter 101 and the second counter 102, to instruct the first counter 101 to record a first low level duration of the data frame and to instruct the second counter 102 to record the quantity of the bit sampling pulse in the first low level duration. In this way, the circuit for calibrating a baud rate can obtain the first low level duration, and estimate a quantity of bits in the first low level duration actually received by the receiving module 20, so that the divider 103 can calculate a calibration baud rate, and the selector 104 outputs the calibration baud rate to the receiving module 20, thereby updating and calibrating the baud rate of the receiving module 20.

Figure 4:
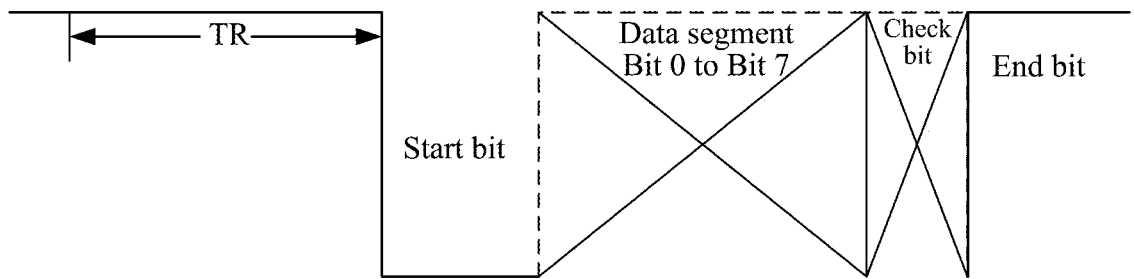
FIG. 4 is a schematic diagram of a data structure of a data frame according to the first embodiment of the present disclosure.

For example, the data frame is assumed to have a data structure shown in FIG. 4. A start bit is at a low level. A check bit may be present or not present and may be a digital signal 0 or a digital signal 1. Therefore, "X" is drawn at the corresponding check bit in FIG. 4. X at a data segment Bit 0 to Bit 7 represents that data may be a digital signal 0 or a digital signal 1, which depends on transferred content. An end bit is at a high level. That a data line is at a high level and lasts at least 10 ms (as shown by TR in FIG. 4) indicates that the data line is in an idle state. If the data line is detected in the idle state and to be transitioned from a high level to a low level, a subsequent low level is definitely a start level corresponding to the start bit. That is, when receiving the data frame sent by the opposite end, the receiving module 20 can detect that the data line is transitioned from a high level in an idle state to a low level. At this time, the receiving module 20 sends the start instruction to the first counter 101 and the second counter 102. Subsequently, when the data line is detected to be transitioned from a low level to a high level for the first time, the receiving module 20 sends the stop instruction to the first counter 101 and the second counter 102, so that the first counter 101 and the second counter 102 start counting from a falling edge of the start bit of the data frame to a first rising edge (a duration from the falling edge of the start bit of the data frame to the first rising edge is the first low level duration of the data frame).

It should be noted that, when data transmission lasts a shorter time, an internal clock offset between two ends of communication has less impact on data reception. Therefore, in this embodiment, when the first low level duration is shorter, the second counter 102 has a smaller count, and a more accurate quantity of bits in the first low level duration actually received by the receiving module 20 is estimated by the circuit for calibrating a baud rate, so that the calculated calibration baud rate is more precise and a success rate of calibration is higher. Therefore, in this embodiment, when all digital signals except the start bit in the data frame received by the receiving module 20 are 1, a success rate of calibration can reach 100%.

In this embodiment, a current baud rate of the receiving module 20 may be preset by a technician or may be a baud rate used when the receiving module 20 receives a last data frame. For example, the current baud rate of the receiving module 20 is 1 Bd. In this case, when the receiving module 20 receives the data frame sent by the opposite end, the receiving module 20 uses its own internal clock of one second as a sampling period to sample the data frame to generate a bit sampling pulse. The bit sampling pulse generated from sampling by the receiving module 20 may correspond to a pulse signal at an intermediate position of each bit.

In this embodiment, when the divider 103 calculates the calibration baud rate according to the first low level duration and the quantity of the bit sampling pulse, the divider 103 performs a division operation on data output by the first counter 101 and data output by the second counter 102, that is, divides the first low level duration by the quantity of the bit sampling pulse, rounds a result of the operation to obtain a frequency division coefficient, and obtains the calibration baud rate according to the frequency division coefficient. In this way, the divider 103 is widely applicable to any serial port chip using an integer frequency divider. For example, the first low level duration recorded by the first counter 101 is 3.3 seconds, and the quantity of the bit sampling pulse recorded by the second counter 102 is 3, so that the frequency division coefficient is [3.3/3], that is, is 1, and the calibration baud rate is 1 Bd.

It should be noted that the selector 104 outputs the calibration baud rate to the receiving module 20 and the receiving module 20 can receive subsequent data frames according to the calibration baud rate. Moreover, when the receiving module 20 receives a next data frame sent by the opposite end, the receiving module 20 may further perform bit sampling on the next data frame according to the calibration baud rate. That is, the first counter 101 can still obtain a first low level duration of the data frame currently received by the receiving module 20, and the second counter 102 can still record a quantity of a bit sampling pulse in the first low level duration, so that the divider 103 can calculate a new calibration baud rate. In this way, when the selector 104 outputs the calculated new calibration baud rate to the receiving module 20, the baud rate of the receiving module 20 is updated another time, so that a baud rate can be calibrated dynamically and in real time.

However, a data format of the data frame, the current baud rate, and the calibration baud rate above are only exemplified, but isn't limited in this embodiment.

It should be noted that, the serial port chip in this embodiment may be provided with a filter connected to the receiving module 20. The filter is configured to filter the data frame received by the receiving module 20, so that operations of the receiving module 20 are all performed on the filtered data frame. Therefore, a timing at which the receiving module 20 sends the start instruction and the stop instruction is affected by noise, and a sample of the receiving module 20 is the filtered data frame, which helps obtain a more accurate calibration baud rate.

Figure 5:
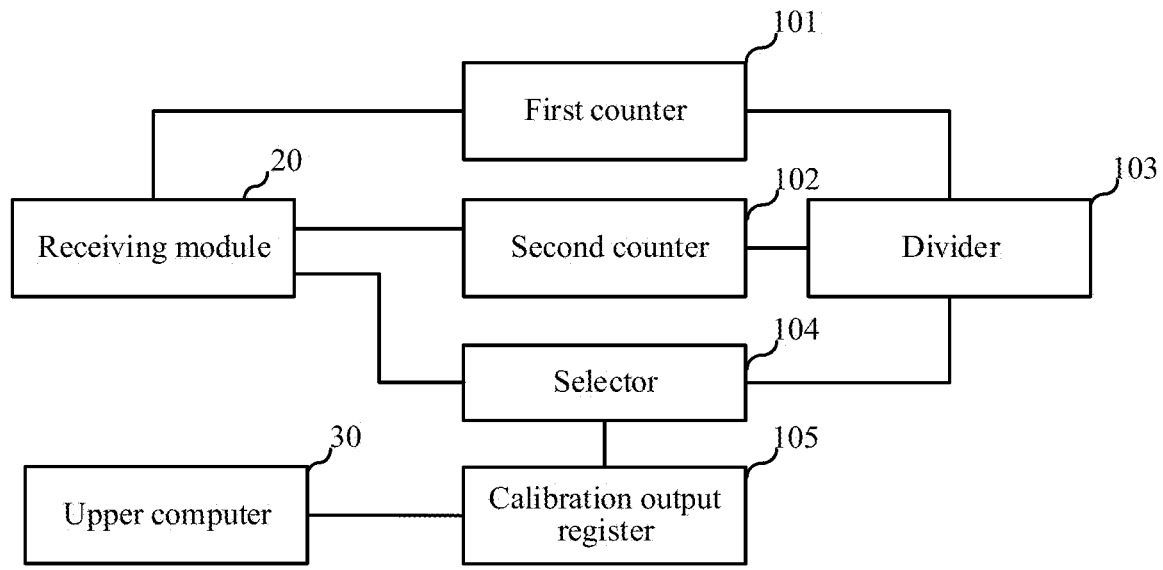
FIG. 5 is a structural schematic diagram showing that the circuit for calibrating a baud rate is provided with a calibration output register 105 and the calibration output register 105 is connected to an host computer 30 according to the first embodiment of the present disclosure.

Moreover, the circuit for calibrating a baud rate in this embodiment may further include a calibration output register 105 (as shown in FIG. 5). The calibration output register 105 is connected to the selector 104 and is configured to output a preset signal after the selector 104 outputs the calibration baud rate to the receiving module 20, where the preset signal is used to represent whether a baud rate of the serial port chip is successfully calibrated. For example, the preset signal is a high level signal, representing that the baud rate of the serial port chip is successfully calibrated.

Specifically, the calibration output register 105 is connected to an host computer 30. The host computer 30 periodically detects an output signal of the calibration output register 105, and presents the detected output signal for a technician to determine, according to the output signal of the calibration output register 105 presented by the host computer 30, whether the baud rate of the serial port chip is successfully calibrated, so that that the technician can gather more useful information.

Compared with existing technologies, the circuit for calibrating a baud rate in this embodiment has a simple structure, requires fewer resources to ensure low costs, and can obtain an actual baud rate in a current process of data transmission without relying on a data frame with a default byte. Therefore, a baud rate is recognized automatically and calibrated dynamically and in real time, efficiency is high, and reliability of subsequent data reception of the receiving module 20 can be improved, thereby helping prepare the serial port chip for a communications system in an extremely fast-changing communication environment and resolving a problem of an increased error rate of the serial port chip in an extreme environment. Moreover, the circuit for calibrating a baud rate can be bypassed directly when the circuit for calibrating a baud rate is not necessary to be used. For example, pins of the first counter 101 and the second counter 102 are enabled to be set at a low level.

Figure 6:
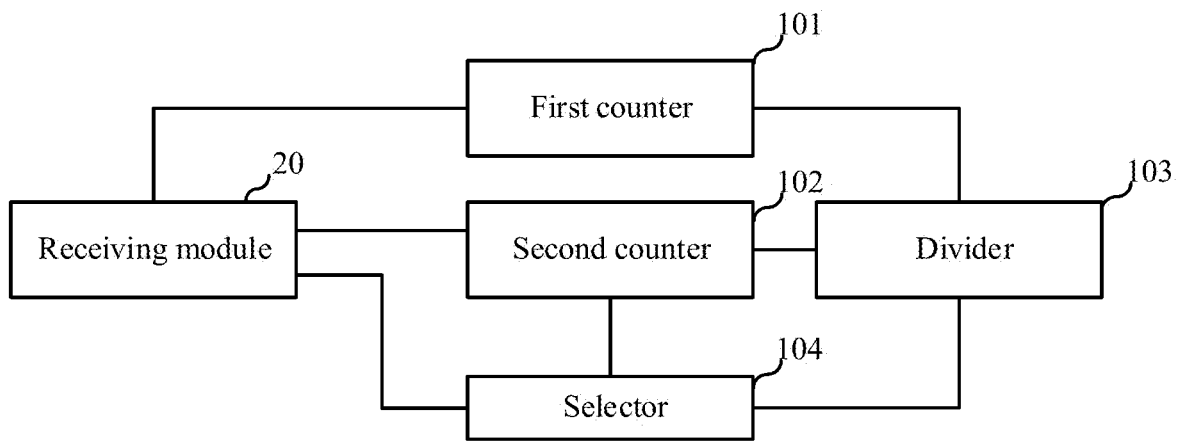
FIG. 6 is a structural schematic diagram of a circuit for calibrating a baud rate according to a second embodiment of the present disclosure.

A second embodiment of the present disclosure relates to a circuit for calibrating a baud rate, as shown in FIG. 6. This embodiment is improved based on the first embodiment. A main improvement is that: the second counter 102 in this embodiment is further connected to the selector 104, and the selector 104 outputs a calibration baud rate to the receiving module 20 only when a quantity of a bit sampling pulse in a first low level duration is less than a preset quantity, to update and replace a baud rate of the receiving module 20, so that the baud rate can be ensured to be calibrated and updated effectively and in time. Details are described below.

Specifically, that the quantity of the bit sampling pulse in the first low level duration is greater than the preset quantity indicates that the receiving module 20 keeps receiving a plurality of digital signals 0, and in this case, an error is highly likely to occur in data reception, or an internal clock offset between two ends of communication is large. In the above case, there is a large difference between the quantity of the bit sampling pulse in the first low level duration recorded by the second counter 102 and a quantity of bits actually sent by an opposite end. Therefore, the calibration baud rate calculated based on data recorded by the second counter 102 has a large error, and the selector 104 should discard a currently calculated calibration baud rate and not update the baud rate of the receiving module 20 according to the currently calculated calibration baud rate. Therefore, in this embodiment, the selector 104 outputs the calibration baud rate to the receiving module 20 only when the quantity of the bit sampling pulse in the first low level duration is less than the preset quantity, to ensure that the baud rate is updated and replaced only if an error is unlikely to occur in data reception of the receiving module 20 and the internal clock offset between the two ends of communication is small, so that the baud rate is calibrated and updated effectively and in time.

More specifically, the preset quantity may be preset in the selector 104 by a technician. For example, the preset quantity may be 7. It should be noted that, the preset quantity may be set by the technician according to a data format of a data frame. A specific implementation of the preset quantity is not limited in this embodiment.

It should be noted that, in this embodiment, if the quantity of the bit sampling pulse in the first low level duration is greater than the preset quantity, the selector 104 discards a currently calculated calibration baud rate and doesn't calibrate the baud rate of the receiving module 20 according to the currently calculated calibration baud rate. However, the selector 104 may wait after discarding the currently calculated calibration baud rate, so that when the receiving module 20 receives a next data frame, the divider 103 may recalculate a calibration baud rate, and the selector 104 may output the calibration baud rate recalculated by the divider 103 to the receiving module 20. In this way, the baud rate of the receiving module 20 can still be updated and calibrated.

Compared with the first embodiment, this embodiment can ensure that the baud rate is calibrated and updated effectively and in time, and reliability of subsequent data reception of the receiving module is further improved.

Figure 7:
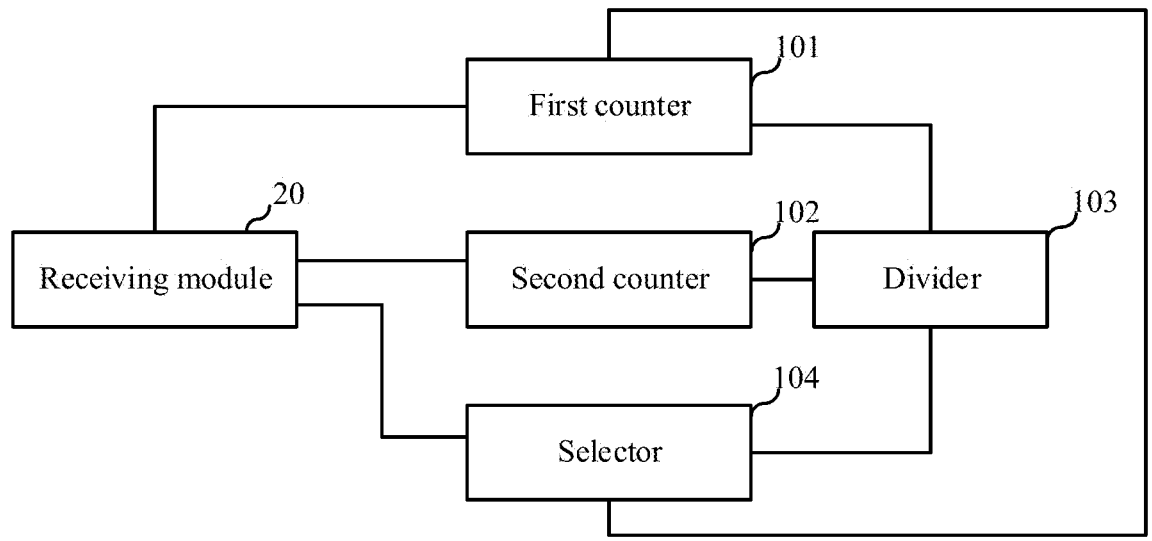
FIG. 7 is a structural schematic diagram of a circuit for calibrating a baud rate according to a third embodiment of the present disclosure.

A third embodiment of the present disclosure relates to a circuit for calibrating a baud rate, as shown in FIG. 7. This embodiment is improved based on the first embodiment. A main improvement is that: the first counter 101 in this embodiment is further connected to the selector 104, and the selector 104 outputs the calibration baud rate to the receiving module 20 only when a first low level duration is less than a preset duration, to update and replace a baud rate of the receiving module 20, so that the baud rate can be ensured to be calibrated and updated effectively and in time. Details are described as follows.

Specifically, that the first low level duration is greater than or equal to the preset duration indicates that the receiving module 20 keeps receiving a plurality of digital signals 0 and in this case, an error is highly likely to occur in data reception. The selector 104 should discard a currently calculated calibration baud rate and not update the baud rate of the receiving module 20 according to the currently calculated calibration baud rate. Therefore, in this embodiment, the selector 104 outputs the calibration baud rate to the receiving module 20 only when the first low level duration is less than the preset duration. In this way, the baud rate is updated and replaced only if an error is unlikely to occur in data reception of the receiving module 20, so that the baud rate can be ensured to be calibrated and updated effectively and in time.

More specifically, the preset duration may be preset in the selector 104 by a technician, or may be generated by the selector 104 based on a current baud rate of the receiving module 20. For example, when the current baud rate of the receiving module 20 is 1 Bd, the selector 104 may set a duration in which 7 bits are transmitted as the preset duration, that is, 7 seconds.

It should be noted that, if the first low level duration is greater than or equal to the preset duration, the selector 104 discards a currently calculated calibration baud rate and doesn't calibrate the baud rate of the receiving module 20 according to the currently calculated calibration baud rate. However, the selector 104 may wait after discarding the currently calculated calibration baud rate, so that when the receiving module 20 receives a next data frame, the divider 103 may recalculate the calibration baud rate, and the selector 104 may output the calibration baud rate recalculated by the divider 103 to the receiving module 20. In this way, the baud rate of the receiving module 20 can still be updated and calibrated.

Compared with the first embodiment, this embodiment can ensure that the baud rate is effectively calibrated and updated, and reliability of subsequent data reception of the receiving module is further improved.

Figure 8:
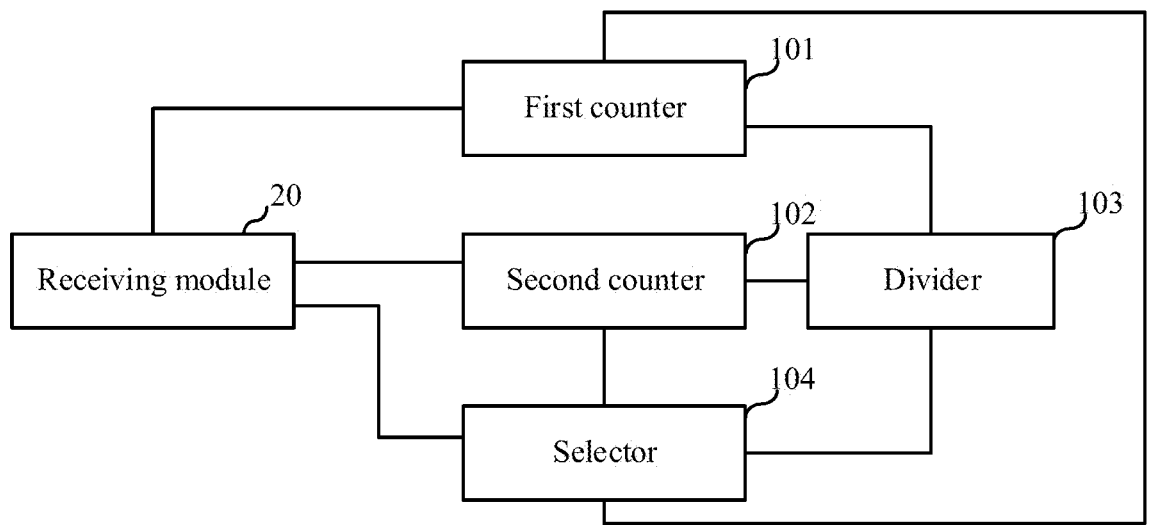
FIG. 8 is a structural schematic diagram showing that a first counter 101 and a second counter 102 of a circuit for calibrating a baud rate are both connected to a selector 104 according to an embodiment of the present disclosure.

It should be noted that, in an embodiment, both the first counter 101 and the second counter 102 may be connected to the selector 104, as shown in FIG. 8. Moreover, the selector 104 outputs the calibration baud rate to the receiving module 20 only when a quantity of a bit sampling pulse in a first low level duration is less than a preset quantity and the first low level duration is less than the preset duration, to update and replace the baud rate of the receiving module 20. In this way, both the first low level duration and the quantity of the bit sampling pulse in the first low level duration are determined, so that the baud rate can be further ensured to be calibrated and updated effectively and in time.

Figure 9:
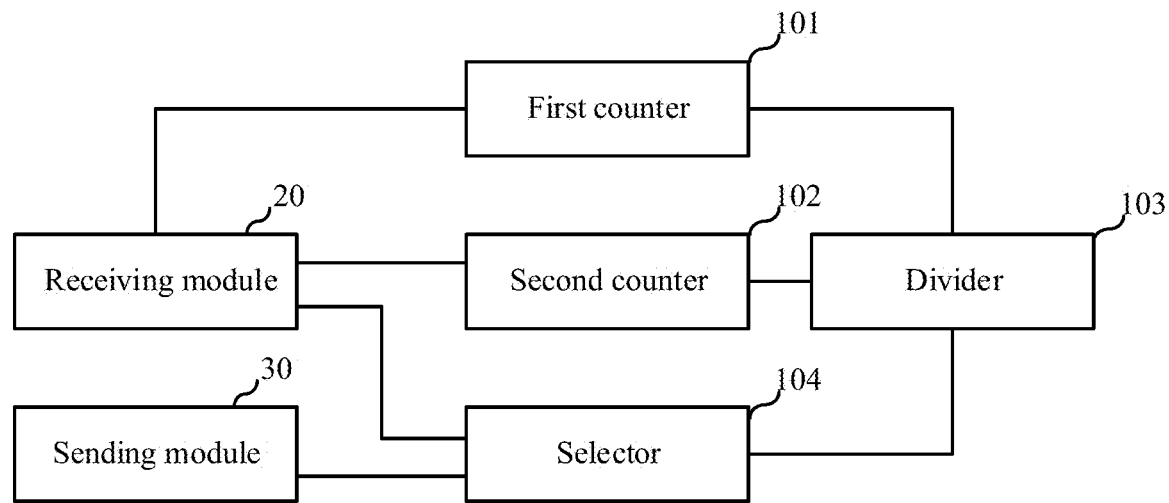
FIG. 9 is a structural schematic diagram of a circuit for calibrating a baud rate according to a fourth embodiment of the present disclosure.

A fourth embodiment of the present disclosure relates to a circuit for calibrating a baud rate, as shown in FIG. 9. This embodiment is improved based on any one of the above embodiments. A main improvement is that: in this embodiment, the selector 104 further calibrates a current baud rate of a sending module 30 of the serial port chip, thereby facilitating reliable reception of data sent by the serial port chip subsequently.

Specifically, the selector 104 is further connected to the sending module 30, and the selector 104 is further configured to output a calibration baud rate to the sending module 30.

More specifically, duplex communication refers to an information interaction mode in which two ends of communication can both send and receive data. In a case of duplex communication, if the selector 104 outputs the calibration baud rate to the sending module 30 to update the baud rate of the sending module 30, the baud rate of the sending module 30 at a local end may match a baud rate of a receiving module at an opposite end, thereby ensuring reliable data transmission of the two ends of communication. However, duplex communication above is only exemplified, and a specific application scenario in which the baud rate of the sending module 30 is updated is not limited in this embodiment.

Figure 10:
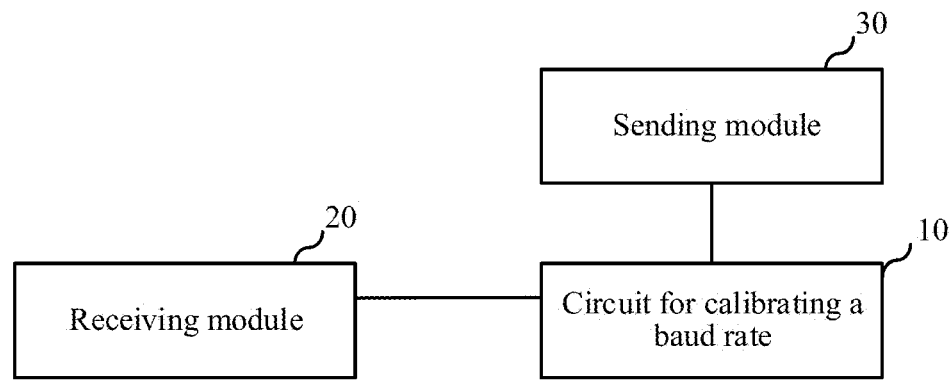
FIG. 10 is a structural schematic diagram of a serial port chip according to a fifth embodiment of the present disclosure.

A fifth embodiment of the present disclosure relates to a serial port chip, as shown in FIG. 10. Details are as follows.

Specifically, the serial port chip at a local end includes a circuit 10 for calibrating a baud rate and a receiving module 20. The circuit 10 for calibrating a baud rate is connected to the receiving module 20. The receiving module 20 is configured to: receive a data frame sent by an opposite end, send a start instruction and a stop instruction according to the data frame, and sample the data frame according to a current baud rate of the receiving module 20 to generate a bit sampling pulse. The circuit 10 for calibrating a baud rate is configured to: calculate a calibration baud rate according to the start instruction, the stop instruction and the bit sampling pulse, and output the calibration baud rate to the receiving module 20. In this way, the baud rate of the receiving module 20 is recognized automatically and calibrated dynamically and in real time, efficiency is high, and reliability of subsequent data reception of the receiving module 20 can be improved, thereby helping prepare the serial port chip for a communications system in an extremely fast-changing communication environment and resolving a problem of an increased error rate of the serial port chip in an extreme environment. Moreover, the circuit 10 for calibrating a baud rate can be bypassed directly when the circuit 10 for calibrating a baud rate is not necessary to be used, so that operations are more convenient.

More specifically, the serial port chip at the local end further includes a sending module 30, and the circuit 10 for calibrating a baud rate may be further connected to the sending module 30 of the serial port chip. In this way, the circuit 10 for calibrating a baud rate may further output the calibration baud rate to the sending module 30 after calculating the calibration baud rate, so that the sending module 30 can send data based on the calibrated current baud rate, thereby facilitating reliable reception of data sent by the serial port chip subsequently.

Figure 11:
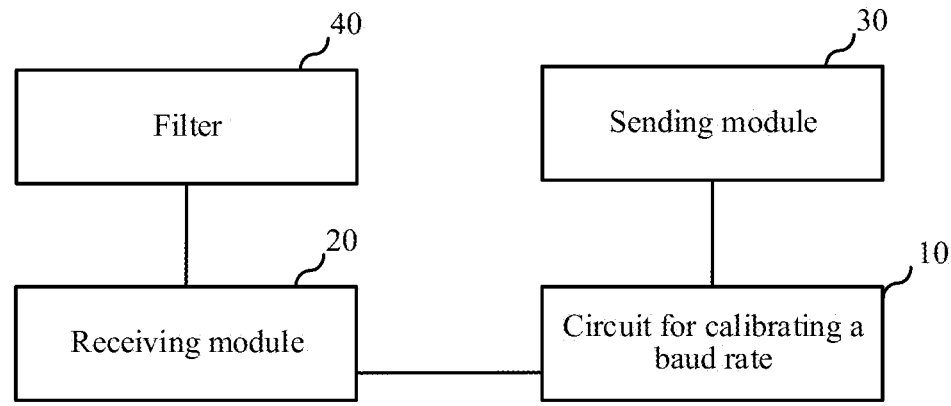
FIG. 11 is a structural schematic diagram of a serial port chip according to a sixth embodiment of the present disclosure.

A sixth embodiment of the present disclosure relates to a serial port chip, as shown in FIG. 11. The sixth embodiment is improved based on the fifth embodiment. A main improvement is that: in this embodiment, the serial port chip further includes a filter 40, so that interference caused by noise can be eliminated, and a current baud rate can be calibrated more accurately. Details are described below.

In this embodiment, the filter 40 is connected to the receiving module 20. The filter 40 is configured to filter the data frame received by the receiving module 20.

Specifically, the receiving module 20 receives data sent by the serial port chip at an opposite end and transmits the received data to the filter 40 for filtering, and the filter 40 returns the filtered data to the receiving module 20. In this way, subsequent operations of the receiving module 20 are all based on a filtered data frame, so that a timing at which the receiving module 20 sends a start instruction and a stop instruction to the circuit 10 for calibrating a baud rate isn't affected by noise, and a sample of the receiving module 20 is a filtered data frame, which helps obtain a more accurate calibration baud rate.

Compared with the fifth embodiment, the current baud rate in this embodiment is calibrated more accurately, and reliability of subsequent data reception of the receiving module 20 is improved.

A person of ordinary skill in the art can understand that the above embodiments are specific examples for implementing the present disclosure, and in an actual application, various changes may be made to the present disclosure in terms of forms and details without departing from the spirit and scope of the present disclosure.

What is claimed is:

1. A circuit for calibrating a baud rate, comprising:
a first counter, connected to a receiving unit of a serial port chip and configured to record a first low level duration of a data frame received by the receiving unit;
a second counter, connected to the receiving unit and configured to: receive a bit sampling pulse, and record a quantity of the bit sampling pulse in the first low level duration, wherein the bit sampling pulse is generated from sampling the data frame by the receiving unit according to a current baud rate of the receiving unit;
a divider, connected to the first counter and the second counter and configured to calculate a calibration baud rate according to the first low level duration and the quantity of the bit sampling pulse in the first low level duration; and
a selector, connected to the receiving unit and the divider and configured to output the calibration baud rate to the receiving unit.

2. The circuit for calibrating a baud rate according to claim 1, wherein the selector is further connected to the first counter, and is configured to output the calibration baud rate to the receiving unit when the first low level duration is less than a preset duration.

3. The circuit for calibrating a baud rate according to claim 2, wherein the preset duration is set by the selector according to the current baud rate of the receiving unit.

4. The circuit for calibrating a baud rate according to claim 1, wherein the selector is further connected to the second counter, and is configured to output the calibration baud rate to the receiving unit when the quantity of the bit sampling pulse in the first low level duration is less than a preset quantity.

5. The circuit for calibrating a baud rate according to claim 4, wherein the preset quantity is 7.

6. The circuit for calibrating a baud rate according to claim 1, wherein the selector is further connected to a sending unit of the serial port chip, and the selector is further configured to output the calibration baud rate to the sending unit.

7. The circuit for calibrating a baud rate according to claim 1, wherein the calibration circuit further comprises:
a calibration output register, connected to the selector and configured to output a preset signal after the selector outputs the calibration baud rate to the receiving unit, wherein the preset signal is used to represent whether a baud rate is successfully calibrated.

8. A serial port chip, comprising:
a receiving unit configured to: receive a data frame sent by an opposite end connected to the serial port chip, send a start instruction and a stop instruction according to the data frame, and sample the data frame according to a current baud rate of the receiving unit to generate a bit sampling pulse; and a circuit for calibrating a baud rate connected to the receiving unit comprising:
a first counter, connected to the receiving unit and configured to record a first low level duration of the data frame received by the receiving unit;
a second counter, connected to the receiving unit and configured to: receive the bit sampling pulse, and record a quantity of the bit sampling pulse in the first low level duration;
a divider, connected to the first counter and the second counter and configured to calculate the calibration baud rate according to the first low level duration and the quantity of the bit sampling pulse in the first low level duration; and
a selector, connected to the receiving unit and the divider and configured to output the calibration baud rate to the receiving unit.

9. The serial port chip according to claim 8, wherein the serial port chip further comprises:
a sending unit, connected to the circuit for calibrating a baud rate; and
the circuit for calibrating a baud rate is further configured to output the calibration baud rate to the sending unit.

10. The serial port chip according to claim 8, wherein the serial port chip further comprises:
a filter, connected to the receiving unit and configured to filter the data frame received by the receiving unit; and
the receiving unit is configured to sample the filtered data frame according to the current baud rate of the receiving unit.

11. The serial port chip according to claim 8, wherein the selector is further connected to the first counter, and is configured to output the calibration baud rate to the receiving unit when the first low level duration is less than a preset duration.

12. The serial port chip according to claim 11, wherein the preset duration is set by the selector according to the current baud rate of the receiving unit.

13. The serial port chip according to claim 8, wherein the selector is further connected to the second counter, and is configured to output the calibration baud rate to the receiving unit when the quantity of the bit sampling pulse in the first low level duration is less than a preset quantity.

14. The serial port chip according to claim 13, wherein the preset quantity is 7.

15. The serial port chip according to claim 8, wherein the selector is further connected to a sending unit of the serial port chip, and the selector is further configured to output the calibration baud rate to the sending unit.

16. The serial port chip according to claim 8, wherein the circuit for calibrating a baud rate further comprises:
a calibration output register, connected to the selector and configured to output a preset signal after the selector outputs the calibration baud rate to the receiving unit, wherein the preset signal is used to represent whether a baud rate is successfully calibrated.

* * * * *